United States Patent
Mergenthaler

(10) Patent No.: US 9,481,043 B2
(45) Date of Patent: Nov. 1, 2016

(54) TOOL CASSETTE FOR INSERTION IN A CASSETTE SEAT AND TOOL HAVING A CASSETTE SEAT FOR A TOOL CASSETTE OF THIS TYPE

(71) Applicant: Kennametal Inc., Latrobe, PA (US)

(72) Inventor: Peter Karl Mergenthaler, Markt Bibart (DE)

(73) Assignee: KENNAMETAL INC., Latrobe, PA (US)

( * ) Notice: Subject to any disclaimer, the term of this patent is extended or adjusted under 35 U.S.C. 154(b) by 264 days.

(21) Appl. No.: 14/244,932

(22) Filed: Apr. 4, 2014

(65) Prior Publication Data

US 2014/0301795 A1    Oct. 9, 2014

(30) Foreign Application Priority Data

Apr. 5, 2013   (DE) ................ 10 2013 206 093

(51) Int. Cl.
| | |
|---|---|
| *B23C 5/00* | (2006.01) |
| *B23C 5/24* | (2006.01) |
| *B23B 51/04* | (2006.01) |

(52) U.S. Cl.
CPC ........... *B23C 5/2472* (2013.01); *B23B 51/048* (2013.01); *B23C 5/241* (2013.01); CPC ......... *B23B 2251/54* (2013.01); *B23B 2260/004* (2013.01); *B23B 2260/038* (2013.01); *B23C 2210/168* (2013.01); *B23C 2245/00* (2013.01); *Y10T 407/1918* (2015.01); *Y10T 407/2244* (2015.01); *Y10T 408/8598* (2015.01)

(58) Field of Classification Search
CPC ............. Y10T 407/1918; Y10T 407/227; Y10T 407/2274; Y10T 407/1922; Y10T 407/1932; Y10T 407/1936; Y10T 407/2214; Y10T 407/222; Y10T 407/2242; Y10T 407/2282; Y10T 407/2284; Y10T 408/858; Y10T 408/8583; Y10T 408/85837; Y10T 408/85834; B23B 29/034; B23B 29/03; B23B 29/00; B23B 29/02; B23B 29/04; B23B 2251/54; B23B 2260/004; B23B 2260/038; B23B 51/048; B23C 2210/168; B23C 2245/00; B23C 5/241; B23C 5/2472

USPC ........... 407/39, 101, 103, 41, 46, 48, 73, 76, 407/87, 107, 108; 408/153–156

See application file for complete search history.

(56) References Cited

U.S. PATENT DOCUMENTS

| | | | | |
|---|---|---|---|---|
| 2,842,233 | A | * 7/1958 | Greenleaf | B23C 5/2269 403/370 |
| 2,996,158 | A | * 8/1961 | Greenleaf | B23C 5/2269 403/370 |
| 5,454,667 | A | * 10/1995 | Cirino | B23B 29/0341 408/153 |
| 7,287,938 | B2 | 10/2007 | Raab | |
| 8,475,086 | B2 | 7/2013 | Mergenthaler | |
| 2010/0028091 | A1 | * 2/2010 | Satran | B23C 5/241 407/39 |

\* cited by examiner

FOREIGN PATENT DOCUMENTS

| | | |
|---|---|---|
| DE | 19708601 A1 | 9/1998 |
| FR | 2615769 A1 * 12/1988 | B23C 5/207 |

OTHER PUBLICATIONS

FR 2615769 Machine Translation, pp. 5-8, Feb. 11, 2016.*

*Primary Examiner* — Daniel Howell
*Assistant Examiner* — Nicole N Ramos
(74) *Attorney, Agent, or Firm* — Ian K. Samways

(57) ABSTRACT

A tool has a tool carrier having a tool cassette with a main body, into which an insert seat for receiving the exchangeable cutting insert is recessed and which has a guide, extending along a direction of adjustment, for an adjusting element for adjusting the position of the main body in the cassette seat in the direction of adjustment. The main body has a first mating surface and at least one second mating surface, wherein the first mating surface extends transversely to the direction of adjustment and the second mating surface extends in the direction of adjustment, and the mating surfaces are configured for the precisely fitting contact against a corresponding first and second contact surface of the cassette seat.

8 Claims, 4 Drawing Sheets

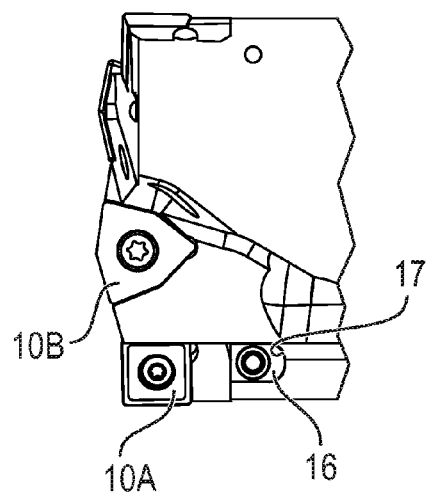
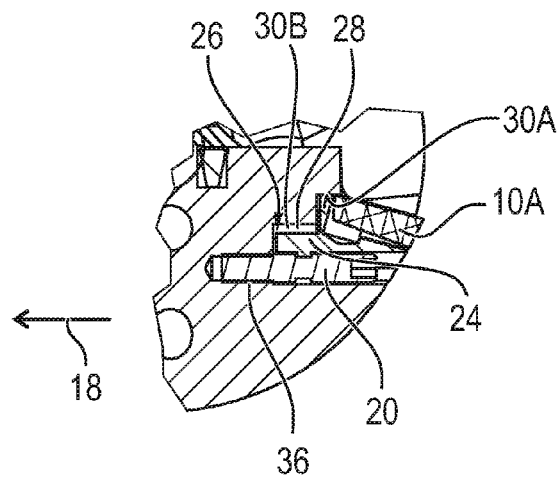
FIG. 2C  FIG. 2D
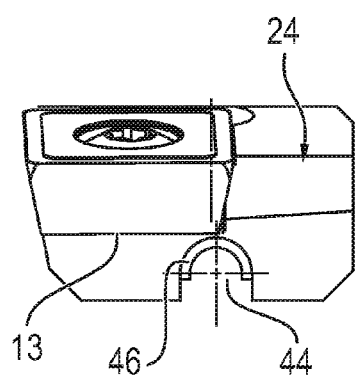
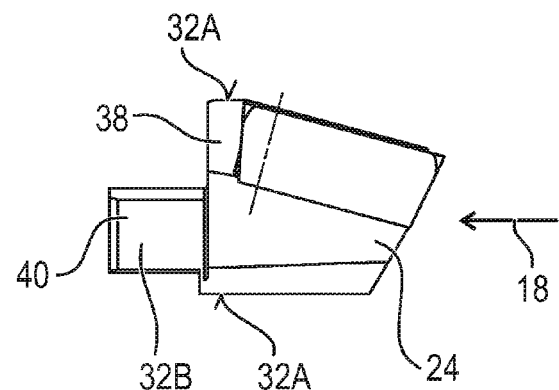
FIG. 3A  FIG. 3B
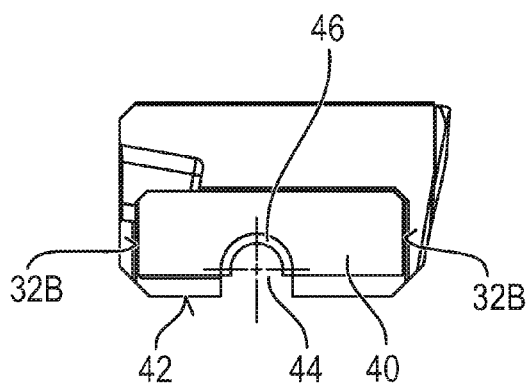
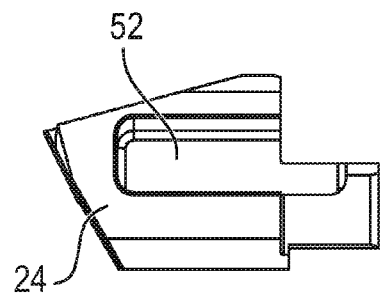
FIG. 3C  FIG. 3D

TOOL CASSETTE FOR INSERTION IN A CASSETTE SEAT AND TOOL HAVING A CASSETTE SEAT FOR A TOOL CASSETTE OF THIS TYPE

CROSS-REFERENCE TO RELATED APPLICATION

This application claims priority from German Application Number 102013206093.9 filed Apr. 5, 2013, which is hereby fully incorporated herein by reference.

BACKGROUND OF THE INVENTION

In modular carrier tools, for example in drilling or milling tools, reversibly exchangeable cutting inserts, in particular tool bits, are frequently fastened to a tool carrier. For setting the exact, in particular radial position of a cutter, there are different adjustment mechanisms. In some cases, the cutting inserts are fastened to a tool cassette, which is then itself adjustable in relation to the tool carrier.

Usually, the adjustment mechanisms here allow a cutter position of the cutting body to be finely adjusted with high accuracy, yet usually with only a very small adjustment travel of typically maximally up to 0.1 mm. With fine adjustment mechanisms of this type, the cutters can therefore be set exactly to a predefined nominal drilling diameter, for which the tool carrier is configured in combination with the respective cutting insert.

SUMMARY OF THE INVENTION

Based on the above, the object of the invention is to define a tool cassette, and a tool for receiving such a tool cassette, which are also suitable for rough machining or roughing.

The object is achieved according to the invention by a tool cassette having the features set forth in the claims.

Advantageous refinements are respectively contained in the subclaims. The tool cassette serves in general terms for insertion in a cassette seat of a tool carrier, in particular of a roughing tool. It has a main body, into which an insert seat for receiving an exchangeable cutting insert, for example an indexable insert, is recessed. The main body has a guide, which extends along a direction of adjustment and in which, in the assembled end setting, an adjusting element for adjusting the position of the main body resides in the cassette seat. The direction of adjustment is here, in particular, a radial direction perpendicular to a central longitudinal axis of the tool carrier. A large adjustment travel of at least 0.5 mm, preferably of at least 1.5 mm and up to 2.5 mm or beyond, is here enabled. In order to enable this large adjustment travel for a rough adjustment, in particular for a roughing tool, the main body has a first, upper mating surface and at least a second, lateral mating surface, wherein the first mating surface extends transversely to the direction of adjustment and the second mating surface extends in the direction of adjustment. Preferably, the mating surfaces are here respectively present in pairs on opposite sides of the main body. They serve respectively for the precisely fitting contact of the main body against a corresponding first and second contact surface of the cassette seat, such that the main body, apart from its mobility in the direction of adjustment, resides in a precisely fitting manner displaceably in the cassette holder. This precisely fitting guidance is here ensured at least over said adjustment travel of at least 0.5 mm, preferably 1.5 mm, and in particular 2.5 mm or beyond.

All in all, this tool cassette therefore serves for use in a tool carrier configured as a roughing tool, i.e. for rough machining, in particular for the production of drill holes or for boring operations. The use of the tool cassette is not, however, limited to drilling tools. As a result of the very large range of adjustment, for example of up to 2.5 mm, in tools of this type the nominal diameter can therefore be varied, in total, by up to 5 mm, if two such tool cassettes are arranged opposite each other. The field of use of such a tool can thereby be extended over several nominal diameters. The tool is here configured, in total, for the production of drilling diameters greater, typically, than 30 mm, in particular greater than 50 mm, up to drilling diameters of around 100 mm.

The adjusting element is here expediently configured as a threaded bolt. The thread is here configured as a conventional metric thread, or else as a fine thread. The adjustment is therefore made in a simple manner by turning of the bolt.

The adjusting element here resides in the main body in a guide, which is expediently configured as a laterally open, in particular half-shell-like channel, into which the adjusting element is insertable. The adjusting element is therefore not stuck through the main body, but is laterally inserted. Expediently, correspondingly to the guide on the main body, a guide channel is also configured on the cassette seat.

In an expedient refinement, the laterally open design enables the arrangement of a bidirectional stop, against which the adjusting element rests with a corresponding counterstop. The stop is here expediently configured as a (partially) annular web within the half-shell-like channel, and the counterstop is configured by an annular groove on the bolt. A particularly simple and, at the same time, robust design of the adjustment mechanism is hereby sufficient.

The insert seat is preferably bounded at the margin, in the direction of adjustment, by a contact web, which is adjoined, with the formation of a step, by a guide pin. The first mating surface is here configured on the contact web, and the second mating surface is configured on both sides of the guide pin, respectively. The cassette seat configured complementarily to the tool cassette therefore correspondingly has also a stepped pocket, into which the tool cassette is introduced with the mating surfaces. As a result of the configuration of the step, the height of the necessary recess in the tool carrier is reduced in the region of the second mating surfaces, so that a high wall thickness remains in the tool carrier in the region of the guide pin. This has a positive impact on the stability of the tool carrier, particularly if further insert seats are configured on the tool carrier, and the cutting forces of these cutting bodies, which cutting forces are generated in the course of the machining, must be absorbed by the tool carrier.

The width of the contact web in the direction of adjustment is here comparatively thin and lies, in particular, somewhat above the maximal adjustment travel, for example in the range of 1.5 to 3 times the adjustment travel. This measure serves to ensure that the upper surface of the contact web, which is configured as the first mating surface, bears over the whole of the adjustment travel also against the associated first stop face of the cassette seat. In addition, this yields the further advantage that, over the whole of the range of adjustment, the pocket of the cassette seat covers this contact web at least in some areas, so that no slit into which dirt particles can enter is formed.

For the clamping of the tool cassette in the cassette seat, a clamping body is additionally provided alongside the main body. The adjustment of the main body is therefore realized in isolation from and independently from the clamping of the main body. The clamping body is here configured, in particular, in the style of a clamping claw.

Expediently, the clamping body has a laterally protruding clamping web, which engages in a lateral recess in the main body. The clamping web and the clamping body are configured such that, in the assembled state, the clamping body clamps the main body transversely to the direction of adjustment, in the direction of a bottom side of the main body, against a bottom base surface of the cassette seat. To this end, the clamping web is preferably configured such that it is inclined, or else cranked, downward in the direction of the bottom side, so that tilting of the tool cassette during clamping of the clamping body is as far as possible avoided.

In order to enable simple assembly, the recess is here configured as a groove which is open at the end and which extends in the direction of adjustment. There is hence the possibility of inserting the clamping body into a pocket-like clamping body receptacle in the cassette seat and of subsequently sliding the main body in the direction of adjustment into the pocket of the cassette seat.

The design of the cassette seat on the tool carrier is complementary to the design of the tool cassette and derives, in particular, from the subclaims assigned to the tool. The tool carrier therefore has contact surfaces assigned to the mating surfaces, which contact surfaces are formed, in particular, by marginal sides of a preferably stepped pocket. The tool cassette resides in a precisely fitting manner in the cassette seat with its mating surfaces on the associated contact surfaces. By "reside in a precisely fitting manner" is here understood a play-free positioning perpendicular to the direction of adjustment. Necessary lead-in tolerances are merely provided to enable the tool cassette to be introduced into the cassette seat and displaced therein. In comparison to the tool cassette, the cassette seat has in the region of the contact surfaces preferably at most a small overmeasure in the region of, for example, maximally up to 0.05 mm.

In an expedient design, on the tool carrier a further insert seat for a further cutting body is configured on the bottom of the cassette seat and the first contact surface is disposed beneath this further insert seat. By "beneath" is here understood a positioning of the contact surface such that, during operation, cutting forces which are generated in the course of the machining are reliably absorbed over the contact surface, and thus over the tool cassette. An improved support of the further cutting body is thereby obtained.

In expedient refinements, correspondingly to the guide on the main body, a guide channel for the adjusting element is configured on the bottom of the cassette seat, so that, in combination with the channel-like guide on the main body, in total a roughly circular guide channel for the adjusting element is configured. In an end-face side wall of the cassette seat is sunk, in alignment with the guide, a threaded bore, into which the bolt can be screwed with its thread region.

In addition, the cassette seat has adjacent to the section for the main body an, in particular, pocket-shaped receptacle, into which the clamping body can be inserted. On the bottom, the receptacle has a threaded bore to enable the clamping body to be clamped against the main body with the aid of a tensioning screw.

For the adjustment of the position of the tool cassette within the cassette seat, the clamping body is first loosened somewhat, so that the tool cassette is displaceable in the direction of displacement. The adjustment can subsequently be realized by means of the adjusting element, before then, in the desired position again, the clamping is realized via the clamping body. The adjusting element itself therefore serves primarily only to perform the adjusting movement. The securement in the desired position is realized mainly by the clamping fastening via the clamping body.

BRIEF DESCRIPTION OF THE DRAWINGS

An illustrative embodiment of the invention is explained in greater detail below with reference to the figures, wherein:

FIG. 2C shows a side view similar to FIG. 2A after a 90° rotation of the tool about a central longitudinal axis, FIG. 2D shows a partially enlarged representation of the sectional representation according to FIG. 2B in the region of the tool cassette, FIGS. 3A-3F shows the tool cassette with therein fastened cutting insert in various views, wherein FIG. 3B shows a side view, FIGS. 3A and 3C show, based on FIG. 3B, respectively a view after a 90° rotation respectively to left and right about a vertical axis, FIGS. 3E and 3F show views after a 90° rotation respectively upward and downward about a horizontal axis, based on the view according to FIG. 3B, and FIG. 3D shows a side view of the opposite side in comparison to the view according to FIG. 3B, i.e. after a 180° rotation about a vertical axis.

FIGS. 4A-4E show various views of the clamping body, wherein FIG. 4A shows a side view, FIG. 4B shows a view rotated relative hereto through 90° to the right about a vertical axis, FIG. 4C shows a view rotated relative to FIG. 4B through 90° upward about a horizontal axis, FIG. 4D shows a view rotated relative to FIG. 4B through 90° downward about a horizontal axis, and FIG. 4E shows a sectional view along the sectional plane A-A according to FIG. 4A.

In the figures, parts which have the same effect are respectively provided with the same reference symbols.

DETAILED DESCRIPTION

Figure 1:
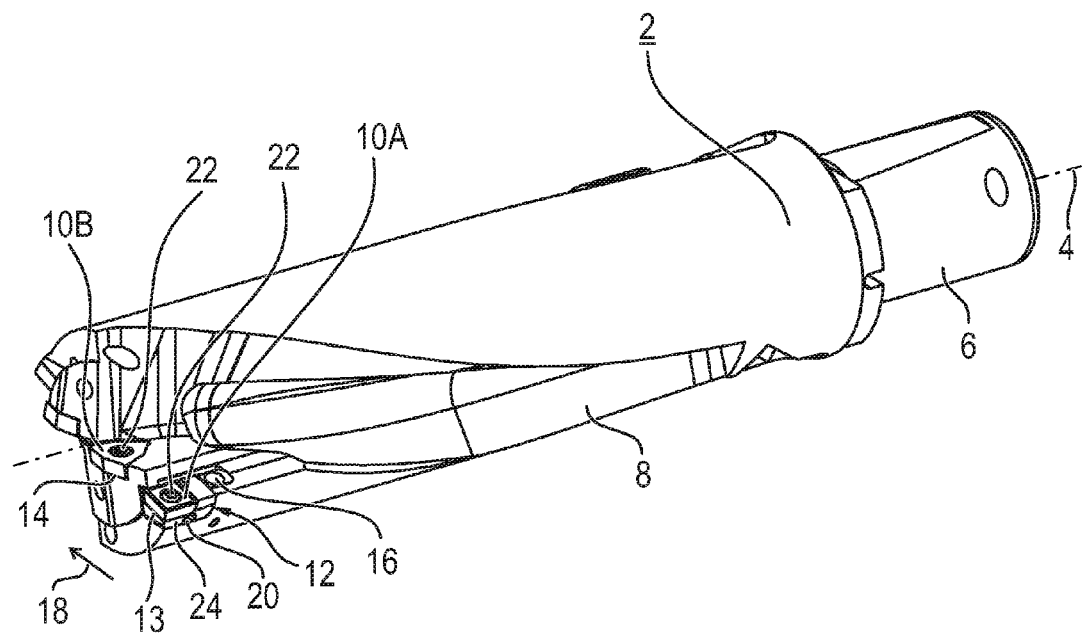
FIG. 1 shows a tool configured as a drilling tool and having a tool carrier in which, on the end face, a plurality of cutting inserts are inserted partially with the aid of tool cassettes.

The tool represented in FIG. 1 is configured as a drilling tool and has a tool carrier 2 which extends along a central longitudinal axis 4, which at the same time forms a rotational axis. At the rear end, the tool carrier has a clamping shank 6 for clamping in a machine tool. In a shank region adjoining the clamping shank 6, the tool carrier 2 has chip grooves 8. On the end face, a plurality of cutting inserts are fastened to the tool carrier 2, namely radially outer cutting inserts 10A, which are respectively fastened in a tool cassette 12 in an insert seat 13, and inner cutting inserts 10B, which are fastened directly in a respectively further insert seat 14 in the tool carrier 2. The cutting inserts 10A, 10B are here configured respectively as indexable inserts. The cutting circles of the outer cutting inserts 10A substantially intersect, whereas the cutting circles of the inner cutting inserts 10B substantially adjoin one another, so that for all cutting inserts 10A, 10B comparable cutting loads are obtained during operation.

The tool cassette 12 serves to receive the respectively radially outer cutting insert 10A and is correspondingly fastened at a radially outer position to the tool carrier 2. The tool cassette 12 here comprises a lateral clamping body 16 for clamping fastening, which resides in a pocket-like receptacle 17 (cf. FIG. 2C) in the tool carrier 2. The tool cassette 12 can be adjusted in the direction of adjustment 18 perpendicular to the central longitudinal axis, i.e. in the radial direction, with the aid of an adjusting element 20, which extends in the direction of adjustment 18. The cutting inserts 10A, 10B are respectively fastened in their respective insert seats 13, 14 with the aid of fastening screws 22.

Figure 2A:
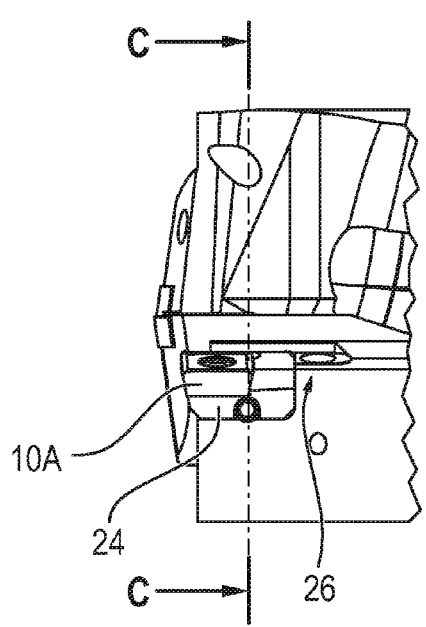
FIG. 2A shows a partial side view in the end face region of the tool according to FIG. 1.
Figure 2B:
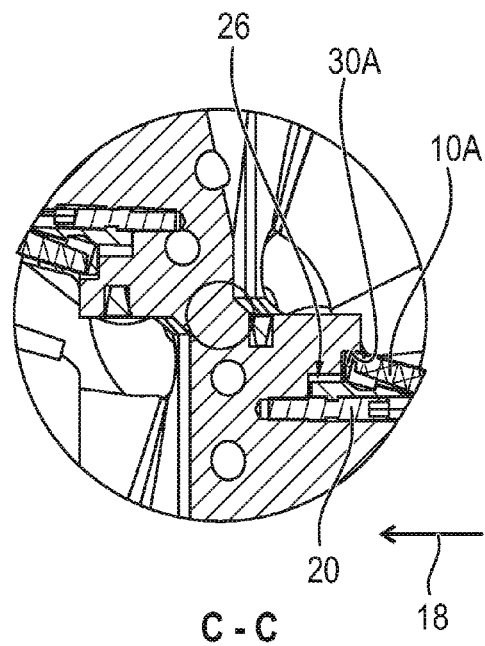
FIG. 2B shows a sectional view according to the sectional line C-C in FIG. 2A.

As can be seen, in particular, from the enlarged representation of FIG. 2D, the tool cassette 12 has a main body 24, which resides in a cassette seat 26 of the tool carrier 2. The cassette seat 26 here has a stepped pocket 28. In the front region of the pocket 28, the latter forms on its top side a first contact surface 30A for a corresponding first mating surface 32A on the main body 24 (regarding the first mating surface 32A, cf., in particular, FIGS. 3B and 3F). In the rear pocket region 28, i.e. after the step in the direction of adjustment 18, the lateral limit walls of the pocket 28 are configured as opposite second contact surfaces 30B. In FIG. 2D, only the rear limit wall can be seen. The contact surfaces 30B serve for the contact of opposite second mating surfaces 32B of the main body 24 (regarding the second mating surfaces 32B, cf. in particular FIGS. 3B and 3C).

Figure 5:
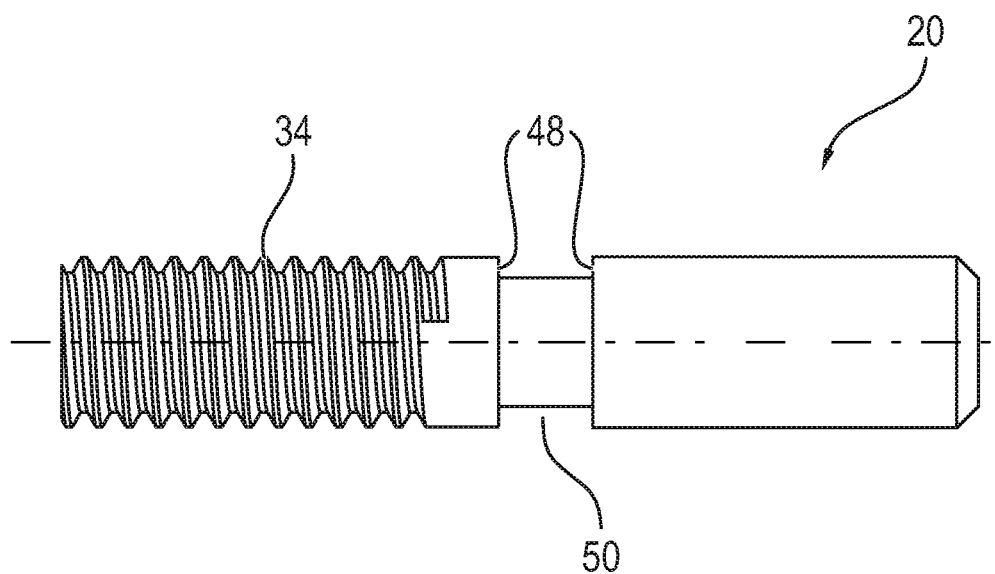
FIG. 5 shows a side view of the bolt-shaped adjusting element.

As can be seen, in particular, also in connection with FIG. 5, the adjusting element 20 is configured as a bolt having a thread 34. With the thread 34, the adjusting element 20 extends into a threaded bore 36 (FIG. 2D) adjoining the pocket 28. The adjusting element 20 is fully received by the main body 24.

The design of the main body 24 can best be seen from FIGS. 3A-3F. The main body 24 is of roughly cuboid configuration in total and has on its front side the inclined insert seat 13, which is bounded in the direction of adjustment 18 by a contact web 38 and by a further lateral, wider marginal web. The insert seat 13 therefore has in total, for instance, an L-shaped contact surface. Two cutters of the, in the illustrative embodiment, square cutting insert 10A are therefore free. The top side of the contact web 38 here forms the first mating surface 32A.

In the direction of adjustment 18, the contact web 38 is adjoined, with the formation of a step, by a guide pin 40, the two opposite side faces of which form the second mating surfaces 32B.

As can be seen, in particular, also from the side view of FIG. 2D, the upper side of the guide pin 40 has clearance to the associated wall of the pocket 28.

The main body 24 has opposite the insert seat 13 a bottom side 42, in which a channel-like guide 44 is recessed. Within the guide 44, a partially annular web 46 is configured as a stop, against which, in both directions, the adjusting element 20 rests with respectively a counterstop 48 for the performance of the adjusting movement and the transmission of the adjusting force. The opposite counterstops 48 are here created by an annular groove 50 and are formed by the lateral circumferential annular faces of the annular groove 50 (cf. FIG. 5).

Figure 3E:
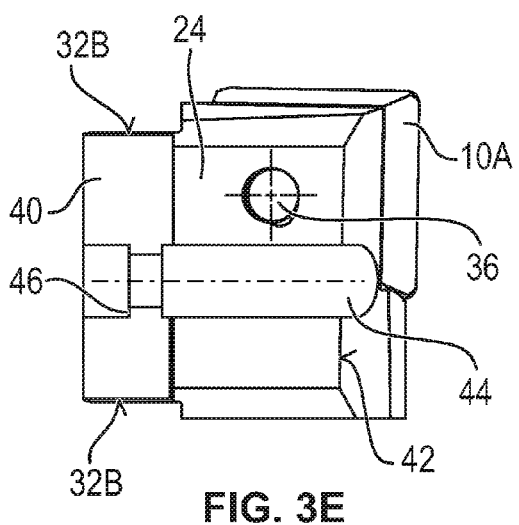
Figure 3F:
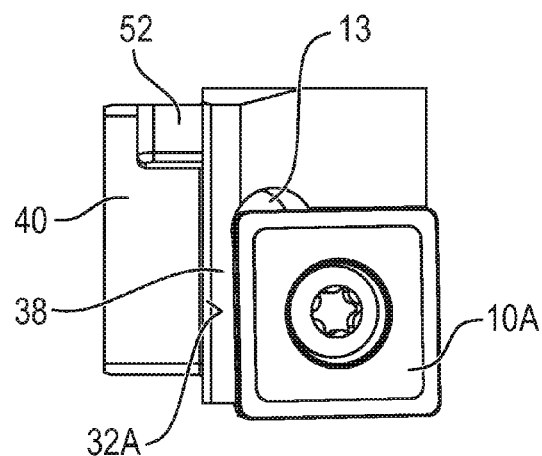
Figure 4A:
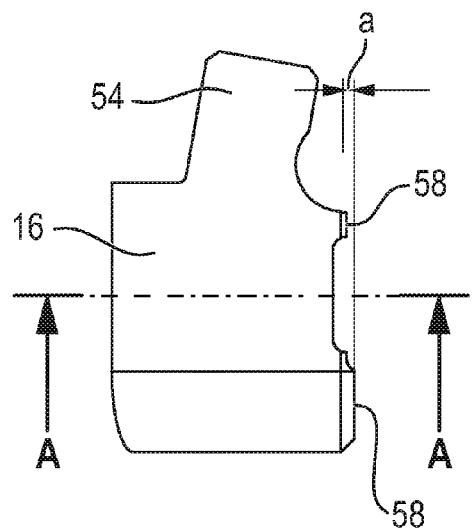
Figure 4B:
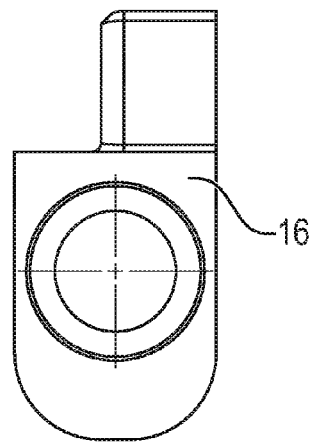
Figure 4C:
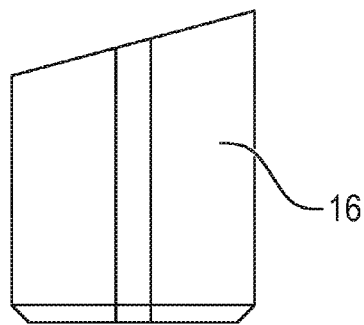
Figure 4D:
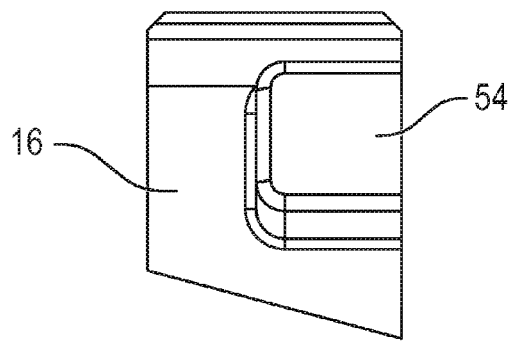
Figure 4E:
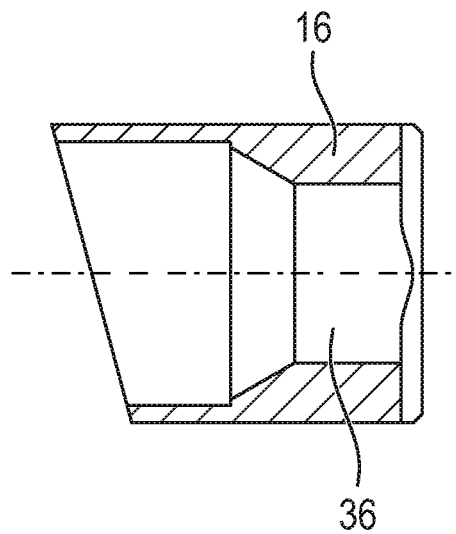

From the view of the bottom side 42 according to FIG. 3E, in addition to the guide 44, in the region of the insert seat 13 can also be seen another threaded bore 36, which in this case is configured as a through bore and is provided for fastening of the cutting insert 10A with the aid of the fastening screw 22.

Finally, from the side view of FIG. 3D, a recess 52 can also be seen. In the direction of adjustment 18, i.e. in the direction of the pocket 28—other than represented in FIG. 3D—said recess is expediently configured as an open groove without rear limit wall.

This recess 52 serves to receive a clamping web 54 of the clamping body 16, as is represented in FIGS. 4A-4E. The clamping web 54 is here shaped on a marginal side of the clamping body 16 as a downwardly cranked element. In addition, on a bottom side are located two supporting regions 58, with which the clamping body 16 rests on a bottom of the pocket-like receptacle 17. The supporting regions 58 are spaced apart, wherein the rear supporting region 58, oriented to the clamping web 54, is set back by a distance a, so that all in all, including in connection with the obliquely positioned clamping web 54, a good clamping effect is obtained.

The here described tool cassette 12, having the main body 24 and the cassette seat 26 configured correspondingly hereto, is distinguished in general terms by the precisely fitting contact of the main body 24 in the preferably all-round closed pocket 28, wherein, to this end, the mating surfaces 32A, 32B correspond with the associated contact surfaces 30A, 30B and extend over the whole of the adjustment travel of the tool cassette 12 in the direction of adjustment 18. The entire adjustment travel here lies preferably in the region of up to 2.5 mm. All in all, a very large cassette adjusting region is hereby obtained, which, in particular in the configuration as a tool for rough machining or roughing, with large nominal diameters greater than 30 mm and in particular greater than 55 mm, is of particular advantage.

What is claimed is:

1. A tool cassette for insertion in a cassette seat of a tool carrier, the tool cassette comprising:
    a main body including:
        an insert seat recessed therein for receiving an exchangeable cutting insert;
        a guide extending along a direction of adjustment and configured for receiving an adjusting element for adjusting the position of the main body in the cassette seat in the direction of adjustment over an adjustment travel of at least 0.5 mm; and
        a guide pin that protrudes radially inwardly from a rear surface of the main body in the direction of adjustment,
    wherein the main body has a first mating surface and at least one second mating surface configured on at least one side of the guide pin, wherein the first mating surface extends transversely to the direction of adjustment and the second mating surface extends in the direction of adjustment and the mating surfaces are configured for precisely fitting contact against a corresponding first and second contact surface of the cassette seat, so that the main body, apart from its mobility in the direction of adjustment, resides in a precisely fitting manner in the cassette seat, and
    further including a clamping body which is configured to clamp the main body in the cassette seat, wherein the clamping body has a laterally protruding clamping web which engages in a lateral recess in the main body such that in the assembled state the clamping body clamps the main body transversely to the direction of adjustment, in the direction of a bottom side of the main body, against the cassette seat.

2. The tool cassette as claimed in claim 1, wherein the adjusting element is configured as a threaded bolt.

3. The tool cassette as claimed in claim 1, wherein the guide is configured on a marginal side of the main body as a half-shell-like channel into which the adjusting element is insertable.

4. The tool cassette as claimed in claim 3, wherein the guide has a bidirectional stop against which the adjusting element rests with a counterstop.

5. The tool cassette as claimed in claim 4, wherein the stop is configured as a partially annular web formed in the guide and the counterstop is configured by an annular groove on the adjusting element.

6. The tool cassette as claimed in claim 1, wherein the insert seat is bounded at a margin in the direction of adjustment by a contact web which is adjoined with the formation of a step by the guide pin, wherein the first mating surface is configured on the contact web, and the second mating surface is configured on both sides of the guide pin, respectively.

7. The tool cassette as claimed in claim 1, wherein the clamping web is configured such that it is inclined downward in the direction of the bottom side.

8. The tool cassette as claimed in claim 7, wherein the recess is configured as a groove which is open at an end thereof.

* * * * *